United States Patent [19]

Hertel, Jr.

[11] Patent Number: 5,462,212
[45] Date of Patent: Oct. 31, 1995

[54] CIGARETTE LIGHTER KEEPER

[76] Inventor: Robert N. Hertel, Jr., 3000 Valley Forge Cir., Apt. 1347, King of Prussia, Pa. 19406

[21] Appl. No.: 276,836

[22] Filed: Jul. 18, 1994

[51] Int. Cl.⁶ .................................................. B60R 7/00
[52] U.S. Cl. ...................... 224/570; 224/278; 224/571; 224/555; 224/483; 206/86
[58] Field of Search .................................. 224/247, 248, 224/278, 42.45 R, 42.42; 211/63, 65, 66, 67, 68, 70.6; 248/689, 316.7, 110, 316.6, 62, 74.2, 76, 77, 316.8; 206/86, 87, 88; 24/3 J; 128/106, 107, 108

[56] References Cited

U.S. PATENT DOCUMENTS

| | | | |
|---|---|---|---|
| D. 212,505 | 10/1968 | Guerrero | D8/396 |
| D. 222,578 | 11/1971 | Walker et al. | D8/396 |
| D. 303,159 | 8/1989 | Heath | D8/395 |
| 755,555 | 3/1904 | Weaver | 211/67 |
| 969,524 | 9/1910 | Condon | 224/247 |
| 1,530,180 | 3/1925 | Holmes | 211/65 |
| 1,768,691 | 7/1930 | Jaskiewicz et al. | 224/278 |
| 1,846,275 | 2/1932 | Palanjian | 206/87 |
| 2,769,219 | 11/1956 | Elkavich | 206/87 |
| 2,809,004 | 10/1957 | Kaufman et al. | 248/74.2 |
| 2,916,155 | 12/1959 | Elliot | 211/65 |
| 4,333,468 | 6/1982 | Geist | 128/DIG. 26 |
| 4,363,432 | 12/1982 | Warthen | 224/252 |
| 4,852,844 | 8/1989 | Villaveces | 248/316.7 |
| 5,121,894 | 6/1992 | Twork, Sr. et al. | 248/316.7 |
| 5,232,136 | 8/1993 | Unger | 224/247 |
| 5,360,190 | 11/1994 | Walker et al. | 224/42.45 R |

FOREIGN PATENT DOCUMENTS 616212  1/1949  United Kingdom ............... 248/316.7

Primary Examiner—Henry J. Recla
Assistant Examiner—Gregory M. Vidovich

[57] ABSTRACT

A cigarette lighter keeper comprising a one-piece base plate formed of a rigid material in a rectangular configuration having short parallel side edges with a vertical center line therebetween and long parallel upper and lower edges with a horizontal center line therebetween, the one-piece base plate having a front face and a rear face parallel with respect to each other; and forwardly extending brackets integrally formed with the front face of the base plate, each of the brackets extending outboardly from the base plate essentially perpendicular to the front face at the inboard extents then arcuately curved away from the horizontal center line and then formed with an opposite curve at the outboard extents thereof, the intermediate extents of the brackets together constituting the greater portion of a circular cross-section for receiving and supporting a cigarette lighter therein, the bracket being fabricated of a resilient material to allow the positioning and removal of a cigarette lighter within the intermediate extents of the brackets.

1 Claim, 4 Drawing Sheets

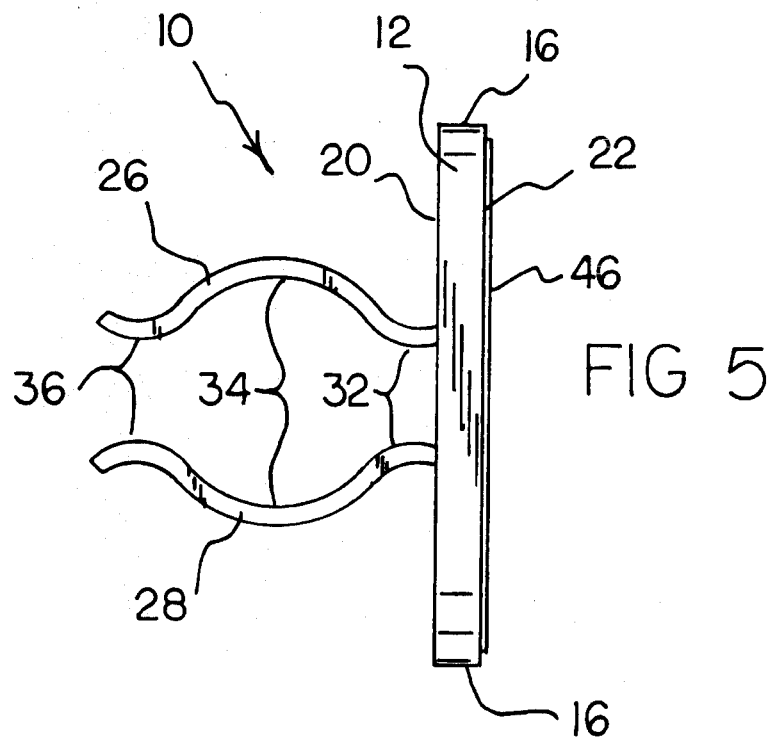
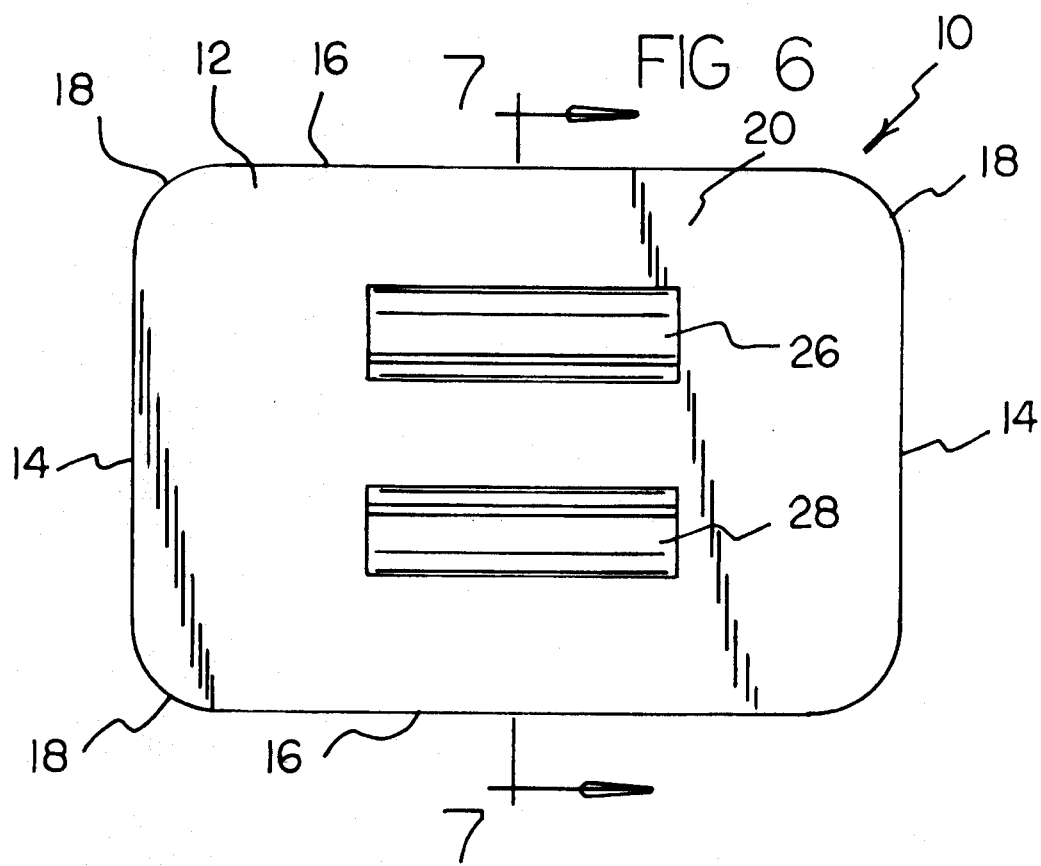

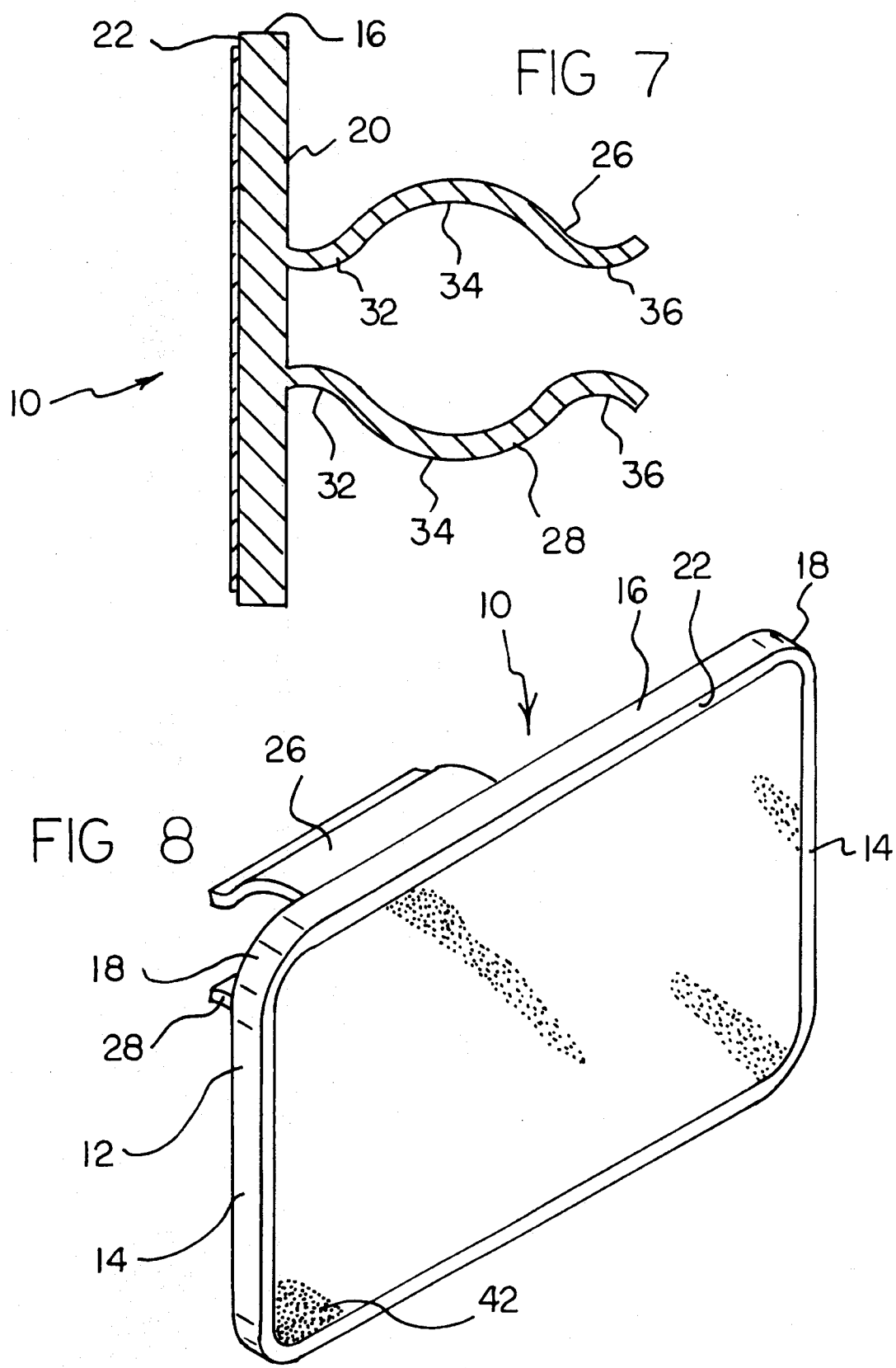

CIGARETTE LIGHTER KEEPER

BACKGROUND OF THE INVENTION

1. Field of the Invention

The present invention relates to a new and improved cigarette lighter keeper and, more particularly, pertains to storing a cigarette lighter after it has been temporarily removed from its receptacle.

2. Description of the Prior Art

The use of devices for receiving and supporting a wide variety of devices and mechanisms is known in the prior art. More specifically, devices for receiving and supporting a wide variety of devices and mechanisms heretofore devised and utilized for the purpose of supporting objects in a temporary location through a wide variety of methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of devices for receiving and supporting a wide variety of devices and mechanisms.

By way of example, U.S. Pat. No. 4,877,164 to Baucom discloses a device for holding cups, cans and similar articles in vehicles.

U.S. Pat. No. 5,029,908 to Belissaire discloses a clip for instant connection device for a fluid conduit and devices having such a clip.

U.S. Pat. No. 5,048,733 to Nagy discloses an automotive accessory mount.

U.S. Pat. No. Des. 273,763 to Sakaguchi discloses a snap-action clip.

Lastly, U.S. Pat. No. Des. 301,976 to Greenhut discloses a holder for broom or similar article.

In this respect, the cigarette lighter keeper according to the present invention substantially departs from the conventional concepts and designs of the prior art, and in doing so provides an apparatus primarily developed for the purpose of storing a cigarette lighter after it has been temporarily removed from its receptacle.

Therefore, it can be appreciated that there exists a continuing need for a new and improved cigarette lighter keeper which can be used for storing a cigarette lighter after it has been temporarily removed from its receptacle. In this regard, the present invention substantially fulfills this need.

SUMMARY OF THE INVENTION

In view of the foregoing disadvantages inherent in the known types of devices for receiving and supporting a wide variety of devices and mechanisms now present in the prior art, the present invention provides a new and improved cigarette lighter keeper. As such, the general purpose of the present invention, which will be described subsequently in greater detail, is to provide a new and improved cigarette lighter keeper and methods which have all the advantages of the prior art and none of the disadvantages.

To attain this, the present invention essentially comprises a new and improved cigarette lighter keeper comprising, in combination, a one-piece base plate formed of a rigid material in a rectangular configuration having short parallel side edges with a vertical center line therebetween and long parallel upper and lower edges with a horizontal center line therebetween with rounded corners between the edges, the one-piece base plate having a front face and a rear face parallel with respect to each other; forwardly extending brackets integrally formed with the front face of the base plate, the brackets being positioned on a central extent of the front face and extending to between about 30 and 50 percent of the width of the base plate on opposite sides of the horizontal center line, each of the brackets extending outboardly from the base plate essentially perpendicular to the front face at the inboard extents then arcuately curved away from the horizontal center line and then formed with an opposite curve at the outboard extents thereof, the intermediate extents of the brackets together constituting the greater portion of a circular cross-section for receiving and supporting a cigarette lighter therein, the bracket being fabricated of a resilient material to allow the positioning and removal of a cigarette lighter within the intermediate extents of the brackets; an adhesive layer formed on the rear surface of the base plate to allow securement thereof to any of a plurality of surfaces within an automobile including beneath the dashboard, within the glove compartment, and the like; and a flexible sheet of peelable material secured over the adhesive layer on the rear surface of the base plate to preclude sticking of the base plate onto a surface until the peelable material is removed.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cigarette lighter keeper which has all the advantages of the prior art devices for receiving and supporting a wide variety of devices and mechanisms and none of the disadvantages.

It is another object of the present invention to provide a new and improved cigarette lighter keeper which may be easily and efficiently manufactured and marketed.

It is a further object of the present invention to provide a new and improved cigarette lighter keeper which is of a durable and reliable construction.

An even further object of the present invention is to provide a new and improved cigarette lighter keeper which is susceptible of a low cost of manufacture with regard to both materials and labor, and which accordingly is then susceptible of low prices of sale to the consuming public, thereby making such a cigarette lighter keeper economically available to the buying public.

Still yet another object of the present invention is to provide a new and improved cigarette lighter keeper which provides in the apparatuses and methods of the prior art some of the advantages thereof, while simultaneously overcoming some of the disadvantages normally associated therewith.

Even still another object of the present invention is to store a cigarette lighter after it has been temporarily removed from its receptacle.

Lastly, it is an object of the present invention to provide a cigarette lighter keeper comprising a one-piece base plate formed of a rigid material in a rectangular configuration having short parallel side edges with a vertical center line therebetween and long parallel upper and lower edges with a horizontal center line therebetween, the one-piece base plate having a front face and a rear face parallel with respect to each other; and forwardly extending brackets integrally formed with the front face of the base plate, each of the brackets extending outboardly from the base plate essentially perpendicular to the front face at the inboard extents then arcuately curved away from the horizontal center line and then formed with an opposite curve at the outboard extents thereof, the intermediate extents of the brackets together constituting the greater portion of a circular cross-section for receiving and supporting a cigarette lighter therein, the bracket being fabricated of a resilient material to allow the positioning and removal of a cigarette lighter within the intermediate extents of the brackets.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a side elevational view of the devices shown in FIGS. 3 and 4.

FIG. 6 is a front elevational view of the device shown in FIGS. 3, 4 and 5.

FIG. 7 is a cross-sectional view taken along line 7—7 of FIG. 6.

FIG. 8 is a perspective view of the device of FIGS. 3 through 8 with the backing sheet removed.

The same reference numerals refer to the same parts throughout the various Figures.

DESCRIPTION OF THE PREFERRED EMBODIMENT

Figure 1:
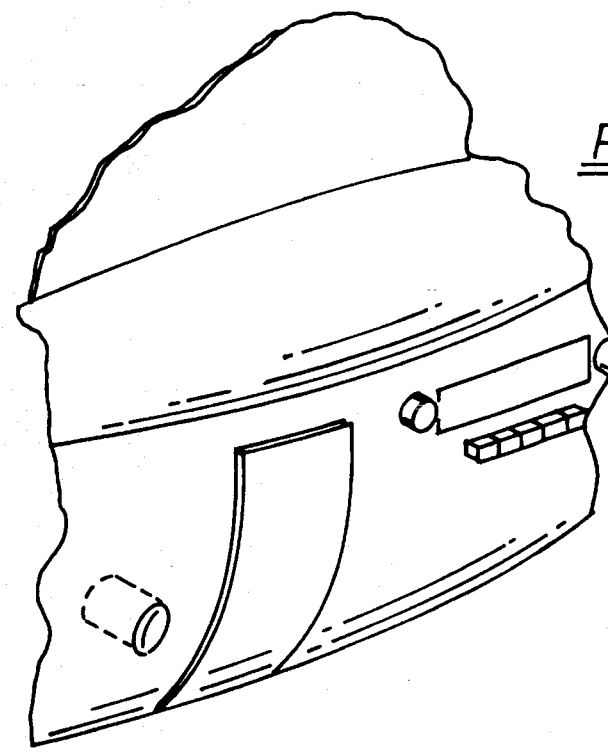
FIG. 1 is a prior art ashtray adapted to be supported in a cigarette lighter receptacle.
Figure 1:
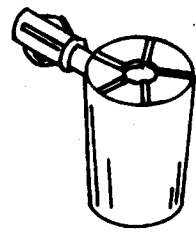
Figure 2:
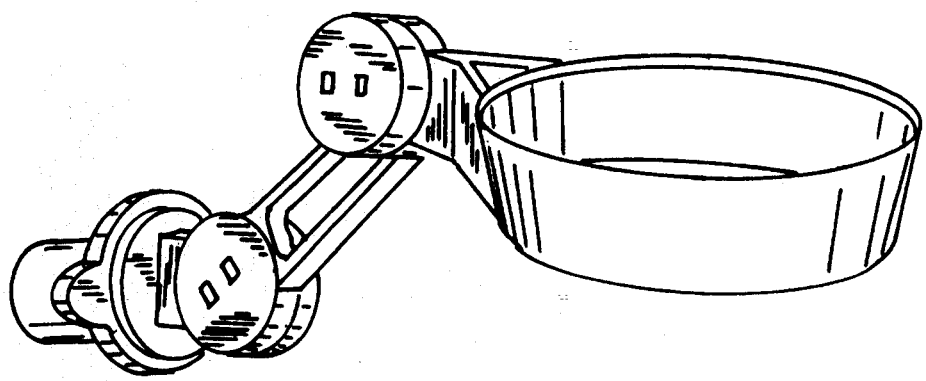
FIG. 2 is a prior art cupholder adapted to be supported by a cigarette lighter receptacle.
Figure 3:
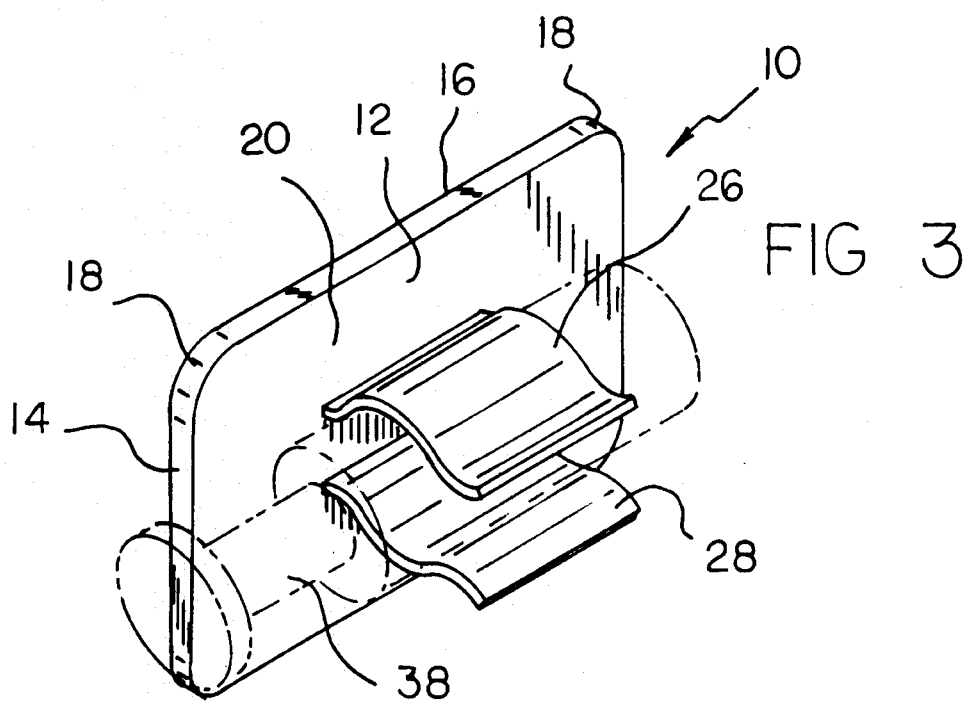
FIG. 3 is a perspective illustration of the preferred embodiment of the new and improved cigarette lighter keeper constructed in accordance with the principles of the present invention.
Figure 4:
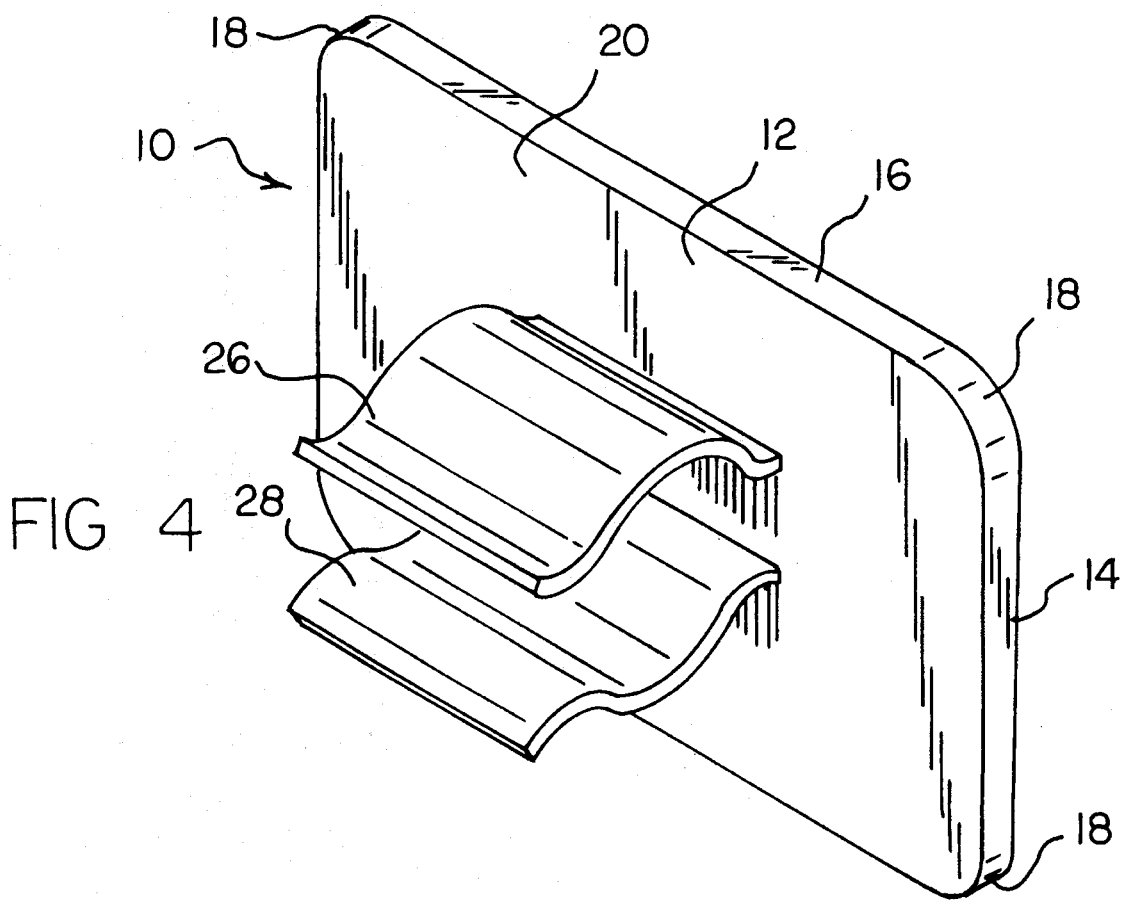
FIG. 4 is a perspective view similar to FIG. 3 but viewed from the opposite side thereof.

With reference now to the drawings, and in particular to FIGS. 1 through 8 thereof, the preferred embodiment of the new and improved cigarette lighter keeper embodying the principles and concepts of the present invention and generally designated by the reference numeral 10 will be described.

The present invention, the new and improved cigarette lighter keeper is a system 10 comprised of a plurality of components. The components in their broadest context include a base plate, brackets, an adhesive layer and sheet material. Each of the individual components is specifically configured and correlated one with respect to the other to attain the desired objectives.

More specifically, the central component of the present invention is a base plate 12. The base plate is formed of one piece of a rigid material such as metal, or preferably plastic. It is formed in a rectangular configuration with short parallel side edges 14. A vertical line extends centrally therebetween. The rectangular configuration also has long parallel upper and lower edges 16. A horizontal center line extends centrally therebetween. The base plate is preferably formed with rounded corners 18 between the edges. In addition, the backing plate is of thin material to minimize undesired flexing and is formed with a front face 20 and a rear face 22. The bases are parallel with respect to each other.

Next provided on the base are forwardly extending brackets 26, 28. The brackets are integrally formed with the front face of the base plate. The brackets are positioned on a central extent of the front face and extend laterally to between about 30 and 50 percent of the width of the base plate there located symmetrically on opposite sides of the horizontal center line.

Each of the brackets extends outboardly away from the front face essentially perpendicular to the front face at their inboard extents 32. The brackets then arcuately curve away from the horizontal center line at the intermediate extents 34 of the bracket. The brackets are then formed with an opposite curve at the outboard extents 36 thereof. The intermediate extents of the brackets are spaced from each other but together they constitute the greater portion of a circular cross-section. This is a region for receiving a supporting a cigarette lighter 38 therein. The brackets are fabricated of a resilient material such as metal, or preferably plastic. This allows for the positioning and removal of the cigarette lighter within the intermediate extents of the bracket when pushed into position between the intermediate extents or pulled therefrom.

The next component of the system is an adhesive layer 42. The adhesive layer is formed on the rear surface of the base plate. The adhesive layer functions to allow securement thereof to any of a plurality of surfaces within an automobile. Typical surfaces include beneath the dashboard, within the glove compartment and the like whether exposed to view by the user or hidden therefrom.

The last component of the system is a flexible sheet of peelable material 46. Thin plastic sheets are well suitable for this function. The peelable material is secured over the adhesive layer on the rear surface of the base plate. The function of the peelable material is to preclude the sticking of the device and its adhesive of the base plate onto a surface until a desired time. At such time the peelable material is removed to expose the adhesive layer which may then be press fit for securement to the recipient surface within the automobile as desired.

The cigarette lighter sockets in automotive vehicles are often used for many other purposes. After the lighter has been removed, the socket serves as the power outlet for such items as heating elements, coolers, air compressors, shavers, emergency lighting, chargers, radar detectors and the like. They offer a great convenience, but when these items are not in use, the socket should be sealed to prevent the entrance of dust and very dangerous tampering by children. The obvious thing to do is to return the cigarette lighter itself into the receptacle. In the haste of setting up the plug-in accessory, few people take the time to register in their minds exactly where they placed the lighter. This sets off a search which can continue through the glove compartment, ashtrays, map pockets and consoles. It can be extended to looking for it under the seats, where it may have rolled after falling off the dash.

The present invention provides the ideal place to store a cigarette lighter after it has been temporarily removed from the receptacle. It is a plastic plate which has clips so that the lighter can be snapped into place. The plate has adhesive on the back which is covered with peel-away backing so it can be attached under the dash, in the glove compartment, or any other suitable location. It is about three inches long and 1¾ inches in width, and can be produced in a wide choice of colors. This simple device will eliminate hunting for a lost lighter.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved cigarette lighter and keeper for holding a cigarette lighter comprising, in combination:

a cylindrical cigarette lighter;

a one-piece base plate formed of a rigid material in a rectangular configuration having rounded corners and having short parallel side edges with a vertical center line therebetween and long parallel upper and lower edges with a horizontal center line therebetween, the one-piece base plate having a front face and a rear face parallel with respect to each other;

two forwardly extending brackets integrally formed with the front face of the base plate, the brackets being positioned on a central extent of the front face and extending to between about 30 and 50 percent of the length of the base plate on opposite sides of the horizontal center line, respectively, each of the brackets extending outboardly from the base plate essentially perpendicular to the front face at the inboard extents of each of the brackets and then arcuately curved away from the horizontal center line and then formed with an opposite curve at the outboard extents of each of the brackets, intermediate extents of each of the brackets together constituting the greater portion of a circular cross-section receiving and supporting the cigarette lighter therein, the brackets being fabricated of a resilient material to allow the positioning and removal of the cigarette lighter within the intermediate extents of the brackets, the brackets being spaced along their entire extents when the cigarette lighter is removed therefrom and when supported thereby;

an adhesive layer formed on the rear face of the base plate to allow securement thereof to any of a plurality of surfaces within an automobile; and a flexible sheet of peelable material secured over the adhesive layer on the rear face of the base plate to preclude sticking of the base plate onto one of said surfaces until the peelable material is removed.

* * * * *